(12) United States Patent
Hashem et al.

(10) Patent No.: US 11,972,202 B2
(45) Date of Patent: *Apr. 30, 2024

(54) CENTRALIZED AND AUTOMATED DOCUMENT GENERATION AND COLLECTION

(71) Applicant: Capital One Services, LLC, McLean, VA (US)

(72) Inventors: Hussam Hashem, Plano, TX (US); Bharath Chekuri, Plano, TX (US); Rahul Raj, Irving, TX (US); Vaishnavi Kakumani, Mckinney, TX (US); Gowtham Guduru, Mckinney, TX (US); Levent Turgut, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,899

(22) Filed: Apr. 7, 2023

(65) Prior Publication Data

US 2023/0244861 A1 Aug. 3, 2023

Related U.S. Application Data

(63) Continuation of application No. 17/481,480, filed on Sep. 22, 2021, now Pat. No. 11,651,148.

(51) Int. Cl.
*G06F 40/174* (2020.01)
*G06F 40/151* (2020.01)
*G06F 40/186* (2020.01)

(52) U.S. Cl.
CPC .......... *G06F 40/174* (2020.01); *G06F 40/151* (2020.01); *G06F 40/186* (2020.01)

(58) Field of Classification Search
CPC ..... G06F 40/174; G06F 40/186; G06F 40/151
See application file for complete search history.

(56) References Cited

U.S. PATENT DOCUMENTS

| | | | |
|---|---|---|---|
| 6,996,781 B1 | 2/2006 | Myers et al. |
| 7,269,784 B1 | 9/2007 | Kasriel et al. |
| 7,415,669 B1 | 8/2008 | Davidson et al. |
| 7,581,177 B1 | 8/2009 | Mollicone et al. |
| 7,904,801 B2 | 3/2011 | Catorcini et al. |
| 9,063,921 B1 | 6/2015 | Cogan |
| 9,563,613 B1 | 2/2017 | Dinkel et al. |
| 10,810,361 B1 | 10/2020 | Venkatraman et al. |
| 11,113,033 B1 | 9/2021 | Bzoch |
| 2005/0050021 A1 | 3/2005 | Timmons |
| 2012/0137207 A1 | 5/2012 | Heinz et al. |
| 2012/0278700 A1 | 11/2012 | Sullivan et al. |
| 2014/0129914 A1 | 5/2014 | Agarwal |
| 2018/0081860 A1 | 3/2018 | Nishida |

(Continued)

*Primary Examiner* — Thu V Huynh
(74) *Attorney, Agent, or Firm* — Sterne, Kessler, Goldstein & Fox P.L.L.C.

(57) ABSTRACT

Disclosed herein are system, method, and computer program product embodiments for receive, via a client application executing on a client device, a request for a dynamically rendered display based on a subset of display fields. The method includes selecting a template from a plurality of templates based at least partially on the subset of display fields, converting the display fields of the template based on the subset of display fields, transforming the display fields to integrate data into the template, and generating a dynamically rendered display or a fillable document for display.

15 Claims, 9 Drawing Sheets

(56) References Cited

U.S. PATENT DOCUMENTS

| | | |
|---|---|---|
| 2019/0114691 A1 | 4/2019 | Zakula |
| 2019/0129931 A1 | 5/2019 | Hegde et al. |
| 2019/0179885 A1 | 6/2019 | Wong et al. |
| 2019/0332641 A1 | 10/2019 | Warner, Jr. |
| 2020/0125903 A1 | 4/2020 | Uchida |
| 2020/0134727 A1 | 4/2020 | Atherton et al. |
| 2020/0210513 A1 | 7/2020 | Evans et al. |
| 2020/0293714 A1 | 9/2020 | Olshanetsky et al. |
| 2020/0380202 A1 | 12/2020 | Cass et al. |
| 2023/0086605 A1 | 3/2023 | Hashem et al. |

CENTRALIZED AND AUTOMATED DOCUMENT GENERATION AND COLLECTION

CROSS-REFERENCE TO RELATED APPLICATIONS

This application is a continuation application of U.S. Utility application Ser. No. 17/481,480 filed Sep. 22, 2021, the contents of which are incorporated herein in their entirety by reference.

BACKGROUND

One major issue with handling a large customer base is the manual work per customer required. Previously, one solution to the problem included printing a copy of a template document, filling it out by hand, then scanning the filled document and faxing/emailing the document. This is a labor-intensive, paper-wasting, process that not only needlessly increases the time it takes for the document to be processed, but disincentivizes the customer/employer from filling out the document in a timely manner, or even filling it out at all. The other issue that arises from this is the lack of scalability. Not everyone has access to printing and scanning capabilities, and the handwritten scanned documents will have to be manually processed.

Another previous solution was to individually call the providing party in order to receive the required information, which is a slow, expensive, and time-consuming process that requires a dedicated agent to perform the calls during a specified time frame. This direct call method presents an entire set of challenging problems including the utilization of a calling infrastructure, agent time, and the providing party time amongst other things including ensuring that the providing party is available during the time of the call. Other solutions that existed previously to generate documents involved multiple problems such as security concerns, license issues, browser dependencies, response latency issues, memory leaks, poor error handling, and difficulty in importing custom fonts, extensibility issues or specialization of a solution to a particular client application (tightly coupled).

Most importantly, prior solutions are specific for each sub-problem of obtaining information from the providing party. They represent distributed solutions that require changes or a new solution depending on new information or a new providing party.

BRIEF DESCRIPTION OF THE DRAWINGS/FIGURES

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
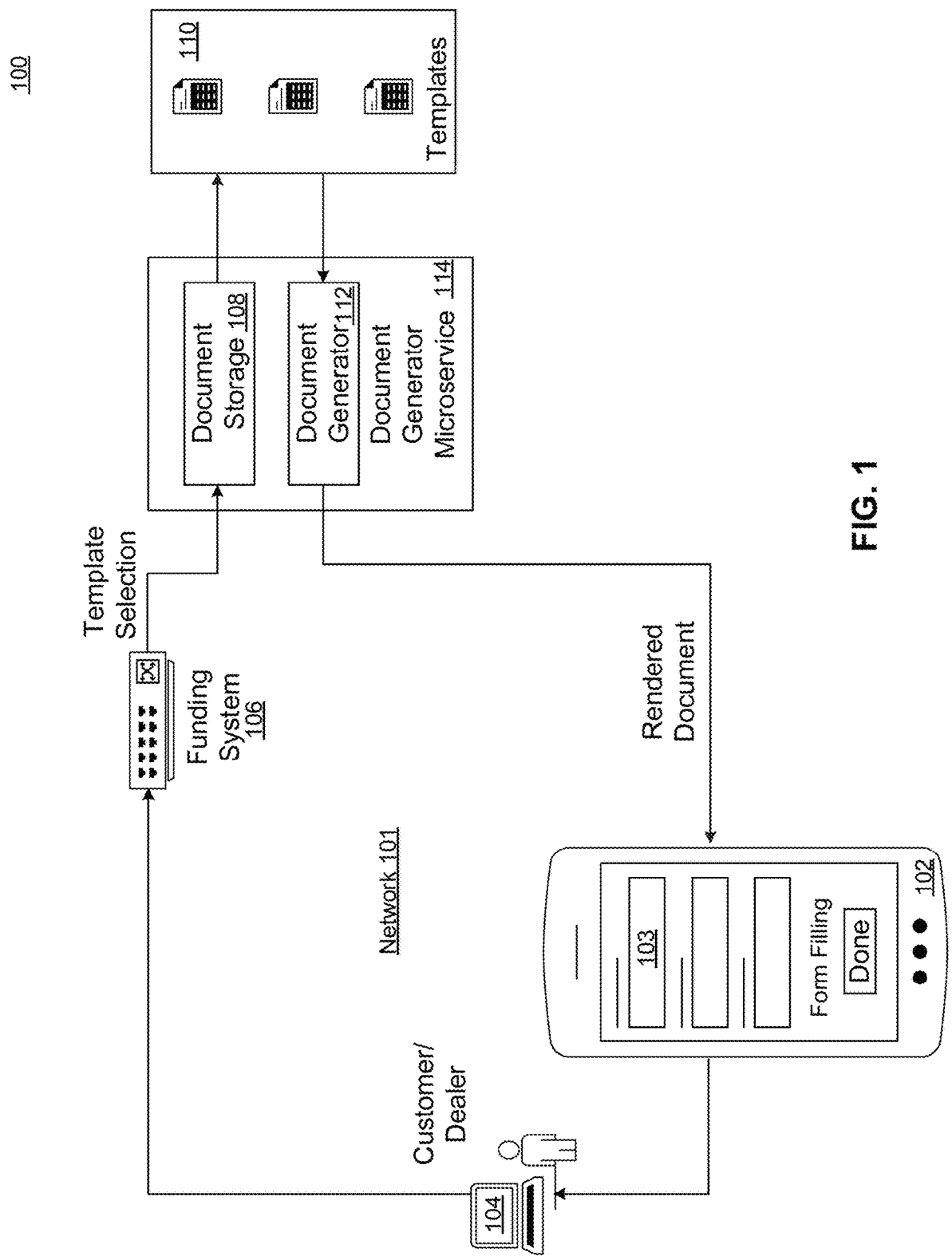
FIG. 1 depicts a block diagram of a system for implementing cloud-based processes to create customized formatted forms, according to some embodiments.

Provided herein are system, apparatus, device, method and/or computer program product embodiments, and/or combinations and sub-combinations thereof, creation of customized formatted documents during a transaction.

In one example embodiment, financial service companies process auto loans for customers. When a customer walks into a dealership to buy a car and lands on a particular vehicle of interest, the dealer can use various financial products to structure a deal. However, the deal cannot be directly shown to customers as it contains additional dealer related information (e.g., cost, commissions, manufacturer incentives, etc.). One of the critical steps in the dealer sales and financing process is to analyze various deal structure options to find and present the best option to the customer. In order to do this, the dealer needs a dynamic way to preview, present, download, and/or print the deal to discuss the vehicle pricing and explain additional charges which involve document fees, front-end products, and backend products in a fast, reliable and customer friendly format all through a browser independent environment. Once a customer decides to go with one of the lenders, the dealer/customer has to submit all the required documents of the customer along with contract details to the lender. These details need to be reviewed manually by lender agents to fund the loan as soon as possible.

In the process of reviewing these deals, additional documents are often required to be submitted by the dealer, the customer, or the customer's employer (collectively, "providing parties"). These documents require specific information, which can often be acquired through a generic template. For example, the customer's employer may receive a template (paper or displayable) to fill out in order to provide a customer's verification of employment.

During the loan underwriting phase, where the dealer has to present deals to the customer, the technology described herein generates a dynamic offer sheet for the dealer. In other words, the offer sheet's fields/layout will change depending on the content that is needed by the consuming application. For example, in a case where a vehicle image is available, the offer sheet will be dynamically generated to include it. However, in a case where a vehicle image is not available, then a different offer sheet will be dynamically generated.

In view of the foregoing description and as will be further described below, the described embodiments result in a mechanism for dynamically formatted document generation and subsequent display. While various embodiments described herein are directed to generation of customized PDFs, the technology described herein is not limited thereto and can be configured to produce any customizable display layout. In addition, while various embodiments are directed to financial processes, the technology described herein is not limited thereto. Throughout the descriptions provided herein, the terms "document", "PDF" and "display" can be interchanged without departing from the scope of the technologies described herein. In addition, the phrases "formatted document", "customized PDF" and "customized display layout" can be interchanged without departing from the scope of the technologies described herein.

FIG. 1 depicts a block diagram of a system 100 for implementing cloud-based processes to create customized formatted documents, according to some embodiments. The technology described herein achieves the functionality described through use of an XSL (eXtensible Stylesheet Language) template. XSL templates are created and stored in computer storage 110, such as, but not limited to, cloud-based server systems. The extensible stylesheet language provides a means to transform and format the contents of an XML, document for display. It includes two parts, XSL Transformation (XSLT) for transforming the XML document, and XSLFO (XSL Formatting Objects) for formatting or applying styles to XML documents. Therefore, the XSL template contains the conditions required to dynamically generate a layout based on the input required by the consuming application. The template is then used to generate a formatted document (e.g., PDF) that can be presented, downloaded, or printed.

While described in specific detail for PDF generation throughout the descriptions provided herein, the technology described herein can generate multiple formats, such as PDF, RTF, TXT, TIFF, PNG, or equivalent customized display layouts, without departing from the scope of the technology described herein.

In an XSL template phase, an application on customer/dealer computing device 104 receives a request for a dynamically rendered document based on a subset of desired content fields. This subset may be based on internal requirements from a customer/dealer. This request is communicated from customer/dealer computing device 104 to server 106 over network 101. Server 106, based on the requested subset of desired content fields, selects a relevant template from template repository 110. For example, server 106 may receive a dealer request for a customer offer document with desired content fields to be displayed in a customized PDF format (static/fillable). From a group of stored XSL templates 110, server 106 selects a template that includes, at a minimum, the desired content fields. More specifically, server 106 may, in some embodiments, select a "best fit" template, where "best fit" is defined as a template that includes each of the desired content fields, even if this template has additional content fields. As will be discussed in greater detail hereafter, any unused content fields of the selected template will be ignored (skipped) during subsequent dynamic document generation. In an alternative embodiment, if no template includes all of the desired content fields, a "best fit" template is defined as a template including as many of the desired content fields as possible. In another alternative embodiment, if no template includes all of the desired content fields, multiple templates may selected and be subsequently merged. In another alternative embodiment, the request may include a prioritized list of desired content fields. In a scenario where no template contains each of the desired content fields, templates may be selected that contain at least the prioritized content fields.

The selected template may be subsequently transferred to a document generator microservice 114. As will be discussed in greater detail in association with FIGS. 2-5, a selected XSL template is converted to an XML document-by-document generator 112 to include the desired fields and an associated layout. An XML document is a basic unit of XML information composed of content elements and markup in an orderly package. In some embodiments, the dealer will also request a specific layout of their desired content fields. For example, an image of a vehicle of interest followed by some features, pricing and possible monthly payments. In addition, in some embodiments, the display device (e.g., smartphone) will dictate fields for display and/or layout based on display format and size. For example, a large display device may allow space for one or more images, where a small display may not. In some embodiments, a type of template may dictate a fixed subset of desired content fields. For example, an automobile loan or a home loan may each have a preferred subset of content fields.

In a dynamic document generation phase, a user interface is generated with the desired display fields (based on the selected template) and presented to the providing party (e.g., smartphone 102) across network 101. For example, document generator 112 may output a rendered fillable interface 103 (e.g., fillable PDF) to smartphone 102. A data providing party may then view the customer generated user interface (e.g. a user-friendly interface, the rendered fillable interface, etc.) from which they can subsequently input required information.

Mobile device 102 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, augmented reality headsets, interactive heads-up display (HUD), etc.), or a similar type of device. Mobile device 102 includes an interface that allows users to interact with and otherwise select objects displayed (e.g., displayed PDF documents and PDF fillable documents).

Document generator microservice 114, XSL templates 110 or customer/client computing device 104 may include one or more servers (e.g., a host server, a web server, an application server, etc.), a data center device, or a similar device, capable of communicating with mobile device 102 via network 101. The one or more servers may include, but is not limited to, a template storage, an XSL (eXtensible Stylesheet Language) generator, an XML generator, a JAVAX (Java X) transformer, an XSL-FO (formatting objects) generator (e.g., PDF), an FOP (Formatting Objects Processor) renderer, image processor, and object processor/database. In some embodiments, the one or more servers may be implemented as a plurality of servers that function collectively as a cloud database for storing/processing data received from mobile device 102 or customer/client computing device 104. The plurality of servers can be co-located at a single location (e.g., server farm) or be geographically distributed across multiple locations and/or multiple servers.

In some embodiments, the one or more servers may include an image application including processing object information, processing requests associated with accessing, uploading, and deleting files, just to name a few examples. Object processor processes object information provided, for example, by mobile device 102. Instead of processing object information locally in mobile device 102, mobile device 102 may also send the object information to the server to perform the processing remotely. Like object storage, the object database may differ from conventional storage in that it is configured specifically to store unstructured data associated with objects as a single element.

Network 101 may include one or more wired and/or wireless networks. For example, the network 101 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

It is to be appreciated that not all steps may be needed to perform the disclosure provided herein. Further, some of the steps may be performed simultaneously or in a different order than shown in FIG. 1, as will be understood by a person of ordinary skill in the art.

The technology described herein provides technical benefits of a streamlined programmatic approach to dynamically generate and render a template-based, user-friendly display object (e.g., printable document format (PDF)). This browser-independent, generalizable document generation capability, can be leveraged in various scenarios to generate documents in a fast, reliable, customizable, and scalable solution. It allows these and other products/processes to define their template to control the document layout based on the required content without using multiple variations of the same template in the storage.

This scalable and generalizable solution also allows this capability to be reusable and easily maintainable. Since the same capability is used by various products and processes, the maintainability greatly improves as only one modernized μ-service (microservice) is needed to house the document generation capabilities. Microservice is a variant of a service-oriented architecture (SOA) structural style. It arranges an application as a collection of loosely coupled services. In a microservice architecture, services are fine-grained and the protocols are lightweight. For example, microservices are often processes that communicate over a network to fulfil a goal using technology-agnostic protocols such as HTTP. Additionally, the process can improve security and remove a requirement for licensed software.

Other technical benefits include the ability to store templates in a cloud-oriented, secure, managed storage environment rather than using other options. The technology further leverages a managed storage environment by adding dynamic images and fonts to the document for full generation capabilities of any type of document. In addition to security and maintainability, removal of licensed software provides greater flexibility and cost savings by switching to well-maintained free open-source software which also provides greater flexibility in the capabilities provided by the instant programmatic approach. The process benefits are centered around reliability, scalability and brand image.

These solutions also enhance current information collection processes by improving cost-savings, general efficiency, accuracy, response rate, response time, and reduction in paper waste in the environment. The providing party does not need to print out, fill out, and then scan the document before sending it which wastes paper as well as time for this labor intensive process. The less work the providing party needs to finish, the faster the task is accomplished and the more likely it is to be completed (particularly with non-binding providing parties such as a customer's employer).

These solutions also provide scalability through the utilization of web technology that allows any providing party with access to the internet the capability to fill-out an online form, which greatly increases the response rate, as well as the accuracy in the response as there are no missing fields and field validation ensures accuracy. Since the fields may also be typed text, there is no need for cost-intensive computer vision technology or manual intervention in order to extract the relevant fields, but rather, they can be part of a fully automated pipeline to process the documents.

Figure 2:
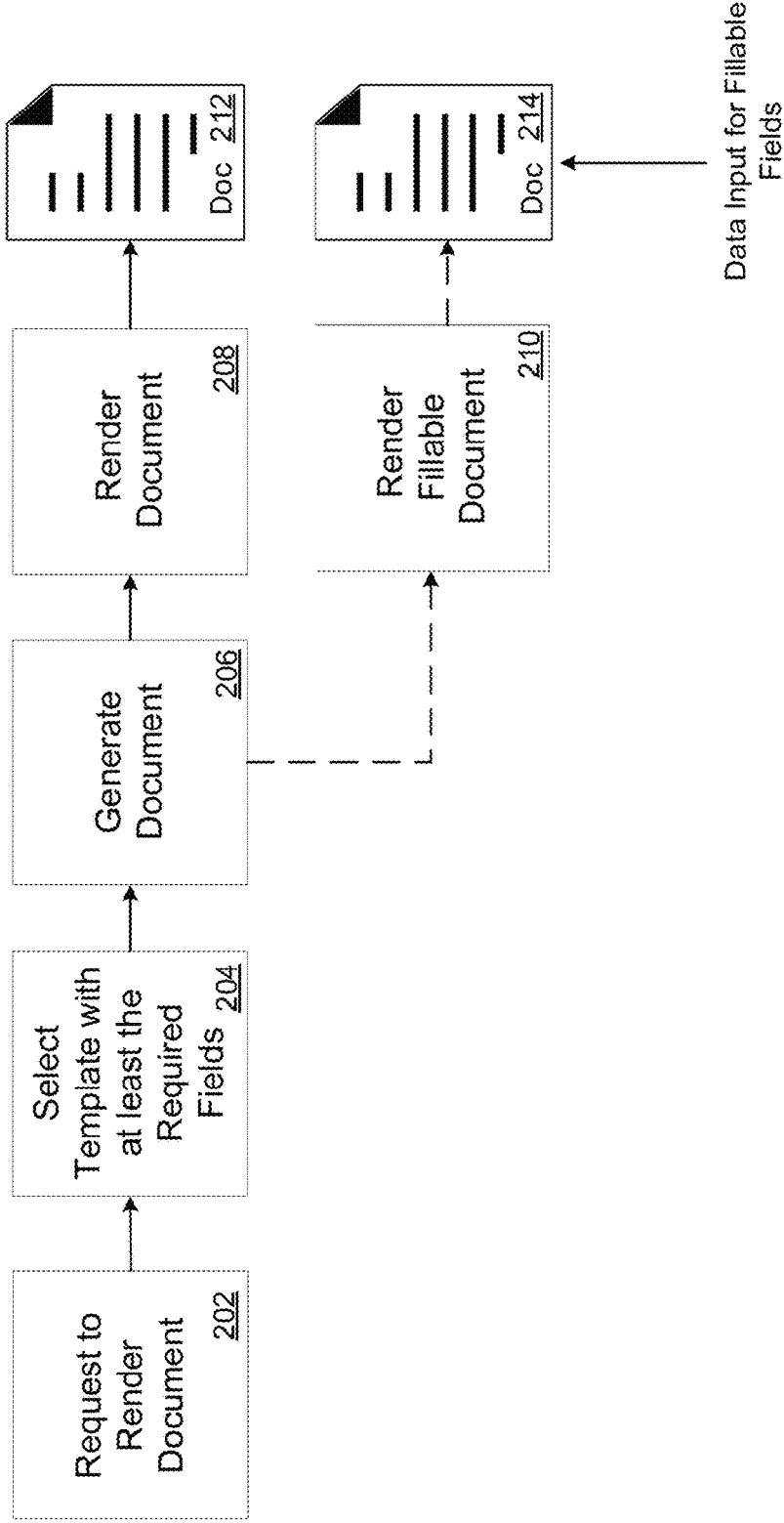
FIG. 2 depicts a flow diagram of rendering customized formatted documents, according to some embodiments.

FIG. 2 depicts a flow diagram of rendering a customized document (e.g., PDF), according to some embodiments. As a non-limiting example with regards to FIG. 1, one or more processes 200 described with respect to FIG. 2 may be performed by a mobile device (e.g., mobile device 102 of FIG. 1) or a server (e.g., document generator microservice 114 or server 807 of cloud processing system 808 of FIG. 8) for displaying a dynamically generated formatted document on the mobile device 102 (or any user's display). In method 200, mobile device 102 and/or a remote server 807 may execute code in memory to perform certain processes associated with FIGS. 1-8. The requested data may be stored locally (e.g., mobile device memory) or remotely (e.g., cloud-based storage).

In step 202, a request to render a document (PDF or other customized display layout) is received by server 106. The request is received, for example, at server 106 from a client application running on a client device (e.g., customer/client computing device 104). The application receives a selection of one or more desired content fields that are to be included in the dynamically rendered document. In addition, a preferred layout may be received. For example, a preferred vehicle offer layout may include vehicle information and a photo of a vehicle at the top of the offer, with financial information following below the photo. These selections are subsequently communicated to server 106 over network 101.

In step 204, a template is selected based on actual information to be displayed. The actual information to be displayed may be obtained from specific requested displayable fields, specific layouts or common fields/layouts for a known document (e.g., loan application form). An application receives a selection of one or more fields that are to be included in the dynamically rendered document. In addition, other criteria may be used to select the template, for example, selecting an automobile template or a home loan template. A specific type of template may include a predetermined set of desired content fields, thus freeing the requestor from an obligation to define the desired content fields. However, in some embodiments, a closest matching template, from a set of templates, may have more fields than are actually needed. In this scenario, a template may be selected based on which template, of a plurality of templates, most closely matches the criteria (e.g., display fields) received in the request for the dynamically rendered document. Therefore, when the template is selected, it is also converted (customized) to include only fields needed for display of the requested information. For example, a request for an offer sheet that contains an image (e.g., of a product for purchase) would select a template that includes at least an image display field, while a similar offer request with no image data could simply omit (skip) this image display field when processing the same template.

In step 206, a document is generated from the template selected (as converted/customized) in step 204 and may include data, images, metadata related to the request to render a document from step 202. Two alternate flows (208 and 210) for document generation (static or fillable) are illustrated in FIG. 2. For example, the two alternate flows can be implemented as XSL to document form generation and XSL to document fillable form generation.

In the XSL to document flow (208 and 212), XSL templates are created by a consumer application. For example, these templates are used to dynamically generate a document 212 that is rendered in step 208 with the requested layout and customized fields. In the example alternate form filling flow (210 and 214), XSL templates are selected based on fields that need additional information to be provided post document (e.g., PDF) generation. These templates dynamically generate a fillable document 214 that is rendered in step 210 with the requested layout and customized fields. Data can be input directly into the fillable document 214 by, for example, a third party who receives, displays and/or interacts with fillable document 214 that is subsequently returned to the requester or lender.

Both of these dynamically generated documents (e.g., 212, 214) contain the required information to enable the requester to proceed with their tasks, saving time, confusion, and frustration for all parties involved. These techniques leverage improvements to technology to provide a novel way for purchasing items using a mobile device.

It is to be appreciated that not all steps may be needed to perform the disclosure provided herein. Further, some of the steps may be performed simultaneously or in a different order than shown in FIG. 2, as will be understood by a person of ordinary skill in the art.

Figure 3:
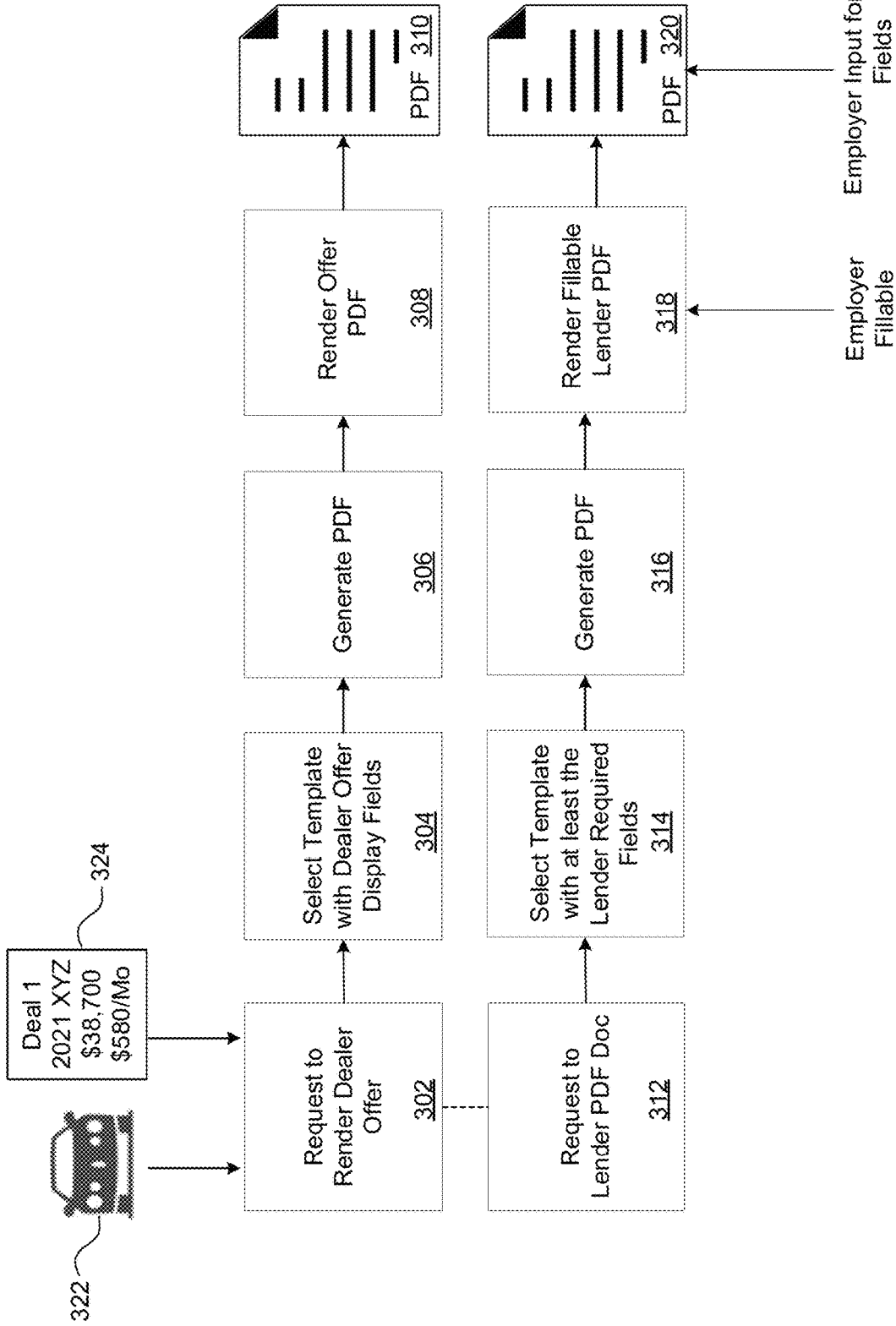
FIG. 3 depicts another flow diagram of rendering customized formatted documents, according to some embodiments.

FIG. 3 depicts a flow diagram 300 of rendering customized PDFs, according to some embodiments. As a non-limiting example with regard to FIG. 2, one or more processes described with respect to FIG. 2 may be performed by a mobile device (e.g., mobile device 102 of FIG. 1) or a server (e.g., server 807 of cloud processing system 808 of FIG. 8). In flow diagram 300, mobile device 102 and/or a remote server may execute code in memory to perform certain processes associated with FIGS. 1-8. The requested data may be stored locally (e.g., mobile device memory) or remotely (e.g., cloud-based storage).

In this example embodiment, the customized PDF generation processes are used to view financing or offers for a select vehicle while on a dealer's storage lot or while engaging with dealer staff. A server receives user selected content fields and selects a template that contains at least these required fields. The deal structure can then be used to complete the underwriting phase after which the deal can enter the funding stage. As part of the funding stage, a lender collects and verifies certain customer-specific information, such as verification of employment.

Based on displayable information received from the dealer, a template can be selected in step 304 that contains at least the dealer specified display fields. For example, the dealer offer 324 may include basic vehicle information, features of the vehicle, pricing, dealer notes, and/or financing information, such as monthly payments, down payment, lease terms, etc. Another field to be displayed may be a picture of a vehicle of interest 322. A template may then selected that provides at least these displayable fields. When the template is selected, it may also be converted (customized) to include only the fields requested for display and, therefore, may omit specific fields present in the selected template. For example, dealer confidential display fields, such as cost information, incentives, sales quotas, etc. may be omitted during processing of the selected template.

In step 306, a PDF (or similar structured document) is generated and, thereafter, rendered, in step 308, to include data, images, and/or metadata related to a specific deal. For example, financing information can be sourced locally through dealer systems (e.g., servers) or remotely through third party financial systems to be rendered in the dynamically generated PDF.

In an alternate PDF form filling sequence, the dealer/lender may require additional financial information during the purchase process. For example, the dealer/lender may request employment verification. A customized fillable PDF can be requested in step 312. While shown as a separate request step 312, the request can alternately be integrated into the original request (two-part request) for a customized offer initiated in previously described step 302. In step 314, templates are selected based on desired content fields to be populated by a receiver of the customized fillable PDF. For example, in an employment verification scenario, a template that includes fields, such as name, date of employment, salary, etc. is selected.

In step 316, a fillable PDF (or similar structured document) 320 is generated from the template selected in step 314 and may include fields related to a specific deal to render a specific fillable PDF 320 in step 318. The fillable PDF 320 can be provided to an employer (e.g., by email), filled and returned as part of the employment verification process. Data can be input directly into the fillable PDF 320 by, for example, a third party who receives, displays and interacts with the fillable PDF 320 that is returned to the requester (e.g., dealer or lender).

Both of these generated PDF documents (e.g., 310, 320) may contain information to enable the requester to proceed with their tasks, saving time, confusion, and frustration for all parties involved. These techniques leverage improvements to technology to provide a novel way for purchasing items using a mobile device.

It is to be appreciated that not all steps may be needed to perform the disclosure provided herein. Further, some of the steps may be performed simultaneously or in a different order than shown in FIG. 3, as will be understood by a person of ordinary skill in the art.

Figure 4:
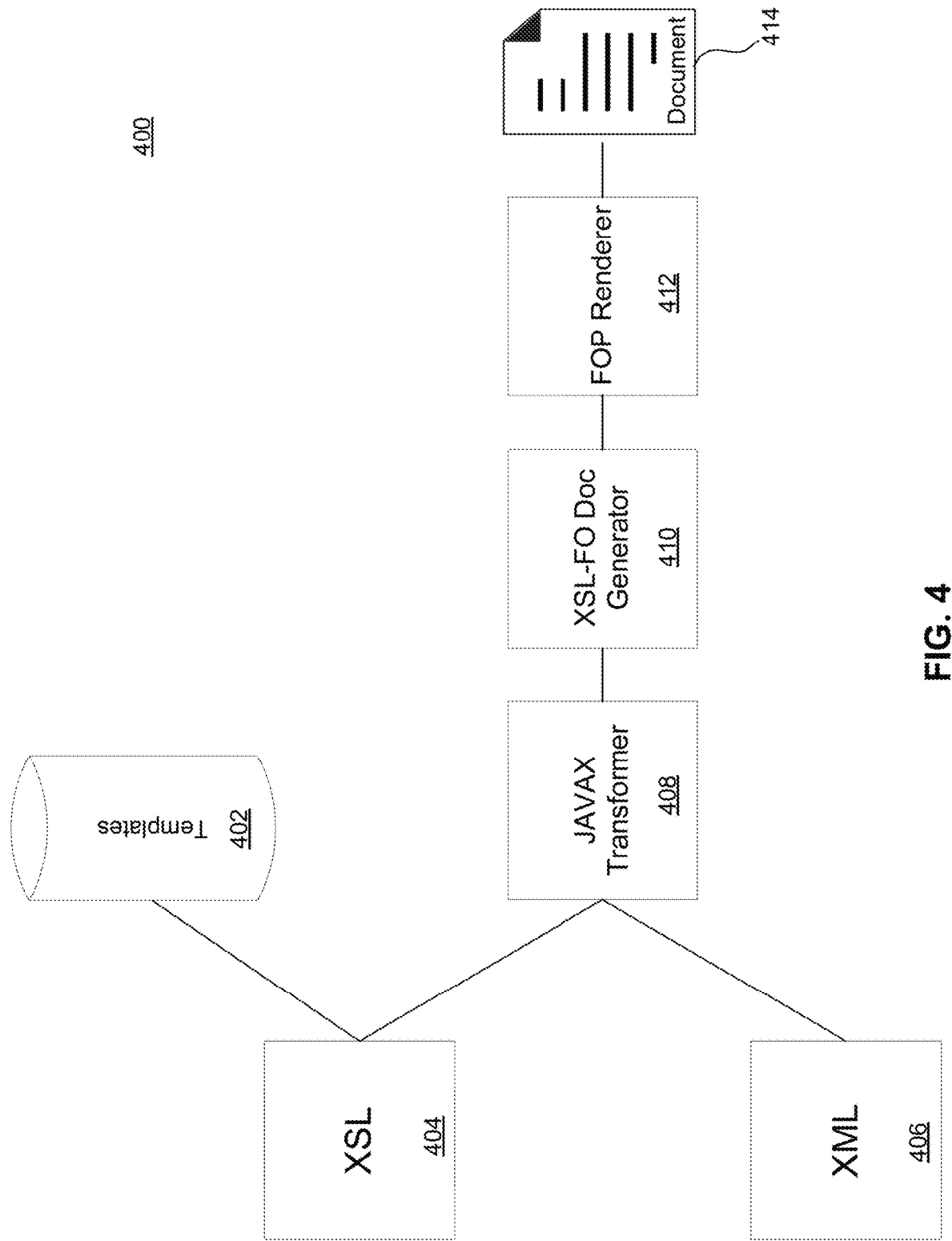
FIG. 4 depicts an example system for generating documents from XSL templates, according to some embodiments.

FIG. 4 depicts a block diagram of a system 400 for implementing processes to generate documents from XSL templates, according to some embodiments. One or more processes described with respect to FIG. 4 may be performed by a mobile device (e.g., mobile device 102 of FIG. 1) or a server (e.g., server 807 as part of cloud processing system 808 of FIG. 8). In such an embodiment, mobile device 102 and/or server may execute code in memory to perform certain steps associated with FIGS. 1-8. While FIG. 4 will be discussed below as being performed by mobile device 102 and/or server, other devices may store the code and execute the code.

When customers submit their data using the dynamically generated user interface as described throughout the descriptions, this data will be validated and converted into XML, so that the system may use XLS parsing to merge the XLS template and user data (XML) to render the document.

In order to supply a customized interface/document, JSON (JavaScript Object Notation) forms are created from pre-set templates 402 which are generated and integrated into the system. JSON is an open standard file format and data interchange format that uses human-readable text to store and transmit data objects consisting of attribute-value pairs and array data types. The system can derive a JSON form directly from the template programmatically following a naming scheme of the fields. Additionally, this JSON form can be manually created or edited afterwards. The JSON forms are then used to dynamically generate a user interface/ formatted document which would be presented (displayed) to the providing party. This user interface may include all the required validations, such as required fields, field types, etc. allowing automated processing of the information provided. The system internally transforms the inputs supplied by the providing parties from the JSON forms to generate a document, as well as stores the JSON as metadata for programmatic use.

Templates 402 are created, for example, with acroforms which are then filled by the system described herein. Acroforms include interactive form technology that includes a traditional document defining a static layout and graphics of the form as well as interactive form fields that are added to the static layout. Templates can be manually created or automatically generated based on known form requirements, layouts, and/or fields.

As shown, JAVAX transformer 408 provides data and structural transformations on an XML document 406 derived from JSON inputs. A template, selected from template storage 402, represents a compiled form of a stylesheet (XSL 404). This template can be used repeatedly, in series or in parallel, to apply the same stylesheet to multiple source documents (or to the same source document with different parameters). The JAVAX transformer 408 sets stylesheet parameters and serialization options based on the template and processes the transformation. The system transforms converted display fields by integrating data and/or images (e.g., of specific vehicle selected). In one example, transaction information, such as, but not limited to, customer information, customer location, vehicle selected, financial information (e.g., financing, options, etc.) are integrated into corresponding display fields.

XSL-FO (XSL Formatting Objects) Doc Generator 410 generates the document using a markup language for XML document formatting that is used to generate, for example, PDF files. XSL-FO provides the transformation and formatting of the XML data.

FOP (Formatting Objects Processor) renderer 412 (e.g., Apache FOP) renders the document 414 for display. FOP renderer 412 is a Java application that converts XSL Formatting Objects (XSL-FO) files to document 414 (PDF or other displayable/printable formats).

Figure 5:
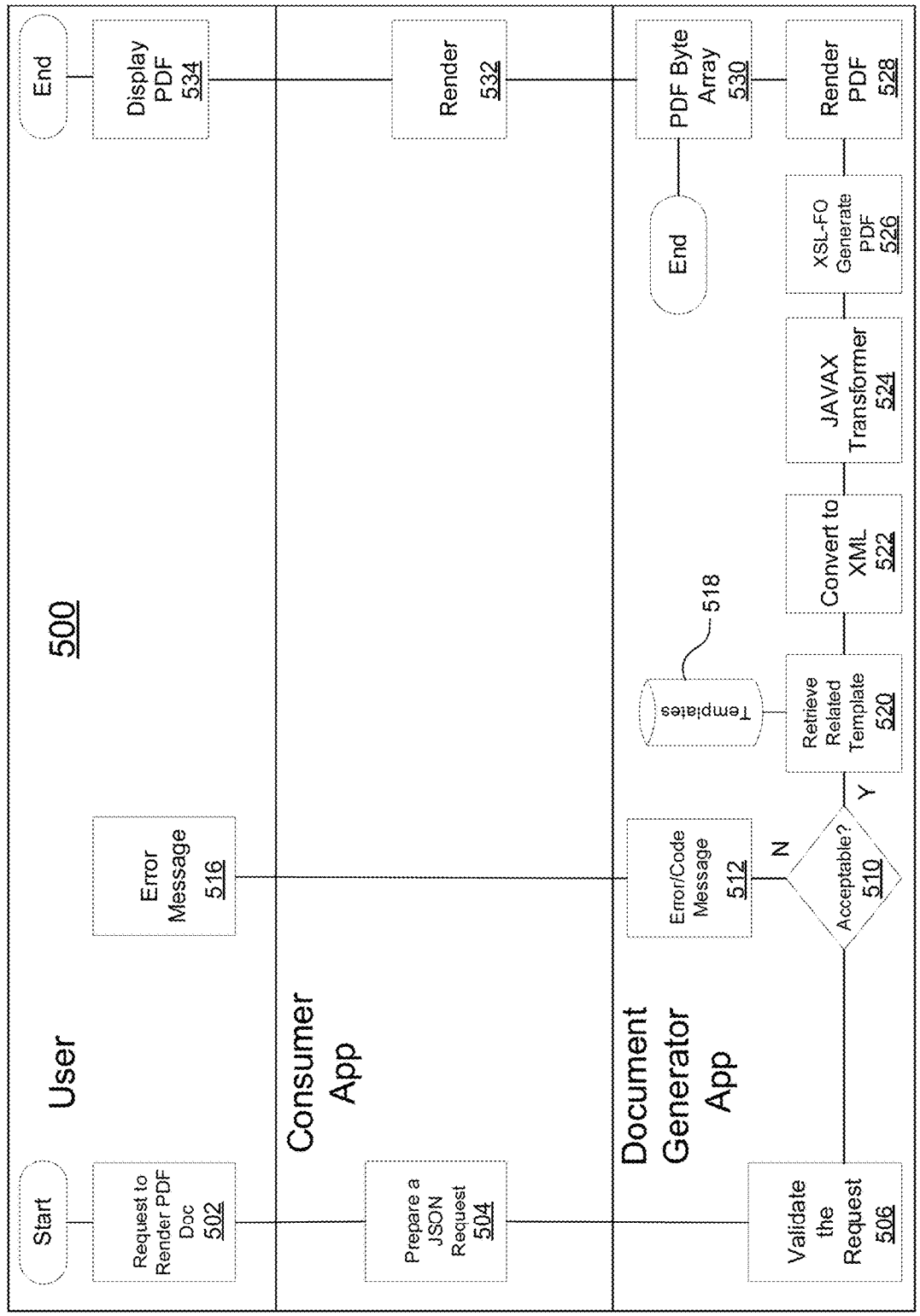
FIG. 5 depicts a timing diagram illustrating a process flow for customization of formatted documents, according to some embodiments.

These dynamically generated documents improve the speed with which computers generate customized documents while consuming less memory and computing resources. In addition, these techniques leverage improvements to technology to provide a novel way for purchasing items using a mobile device FIG. 5 depicts a flow diagram of a method 500 for implementing cloud-based processes to create customized displays (formatted forms), according to some embodiments. As a non-limiting example with regards to FIGS. 1-8, one or more processes described with respect to FIG. 5 may be performed by a mobile device (e.g., mobile device 102 of FIG. 1), cloud-based storage/processing system or local server. In such an embodiment, mobile device 102 and/or server may execute code in memory to perform certain steps of method 500 of FIG. 5. While FIG. 5 will be discussed below as being performed by mobile device 102 and/or server, other devices including may store code and therefore may execute by directly executing the code. Moreover, it is to be appreciated that not all steps may be needed to perform the disclosure provided herein. Further, some of the steps may be performed simultaneously or in a different order than shown in FIG. 5, as will be understood by a person of ordinary skill in the art.

In 502, a computing device (e.g., an application executing on a mobile device) receives a request to render a document. The computing device (or the apps on the computing device) may, in one embodiment, perform the steps up to and including rendering the PDF and causing the PDF to be displayed. For example, a car dealer requests a PDF document displaying an offer or financing option for a customer. Alternatively, the request may be received from the customer directly requesting the offer or financing option. The user may also be an internal system requesting to render a PDF for other purposes, including, but not limited to: generating invoice documents, dealer performance scorecards, statements, agreements, legal documents, disclosures, etc.

In 504, a JSON request is prepared with template, template version and customer information required to generate the document based on the customer/dealer/internal system request. However, the original templates to generate documents will not be changed (unneeded data fields will be omitted). In some embodiments, data provided to generate documents may be different for each individual customer. In some embodiments, the system creates multiple versions of templates, based on the request data and time. The system may choose the latest template version or compatible template version to render the document.

In 506, a document generator validates the JSON request. The JSON request is validated internally using existing information of the customer, dealer, vehicle, etc. This information is used to validate the JSON request from a business perspective (to ensure that process doesn't intake false information, incorrect information, typographical errors, or other miscommunications or deficits in information). These are non-limiting examples of what constitutes a valid request.

In 510, it is determined if the validated request meets acceptable standards. A JSON request is considered acceptable when it adheres to external standards, such a JSON standards (As non-limiting examples: balanced curly brackets, quotes, and other symbols that ensure request uniformity and adherence to standards); as well as internal standards (including but not limited to: the existence and availability of the selected template(s), the existence of the given field(s) in the selected template(s), and the matching of the field type parameters (e.g., if the template contains a field of a numeric type, the given value to populate the aforementioned field must be of a numeric type). If not acceptable, an error message is generated in step 512 and passed back to the user for display in 516.

If acceptable, in 520, a template is retrieved from template storage 518 and stored in document generator storage 108. The template selected is based at least partially on required fields in the request. In one non-limiting example, a document generation microservice can automatically make decisions based on a type of document request made by customer/dealer/internal system. The document microservice will be pre-configured to serve the user request. In this case, there is no need to provide the template information, the requester only needs to provide the type of document (offers, financial options, etc.) and customer data to render the final document. In another non-limiting example, users can also provide the template, template version and customer data required to render the final document. The microservice will pull the user requested templates from storage and execute the steps to render the final document.

In 522, the template is converted to XML and transformed by JAVAX transformer 524 to include data, images, and/or associated metadata and, in 526, a PDF is generated, rendered (image) in 528, and converted to a PDF byte array (e.g., encode the string into a sequence of bytes) in 530. In 532, the consumer app renders the PDF and, in 534, displays it on the user's display.

While described in a specific timing order, variations in timing or order of steps, variations in data destinations or originations, are considered within the scope of the instant technology described herein.

Figure 6:
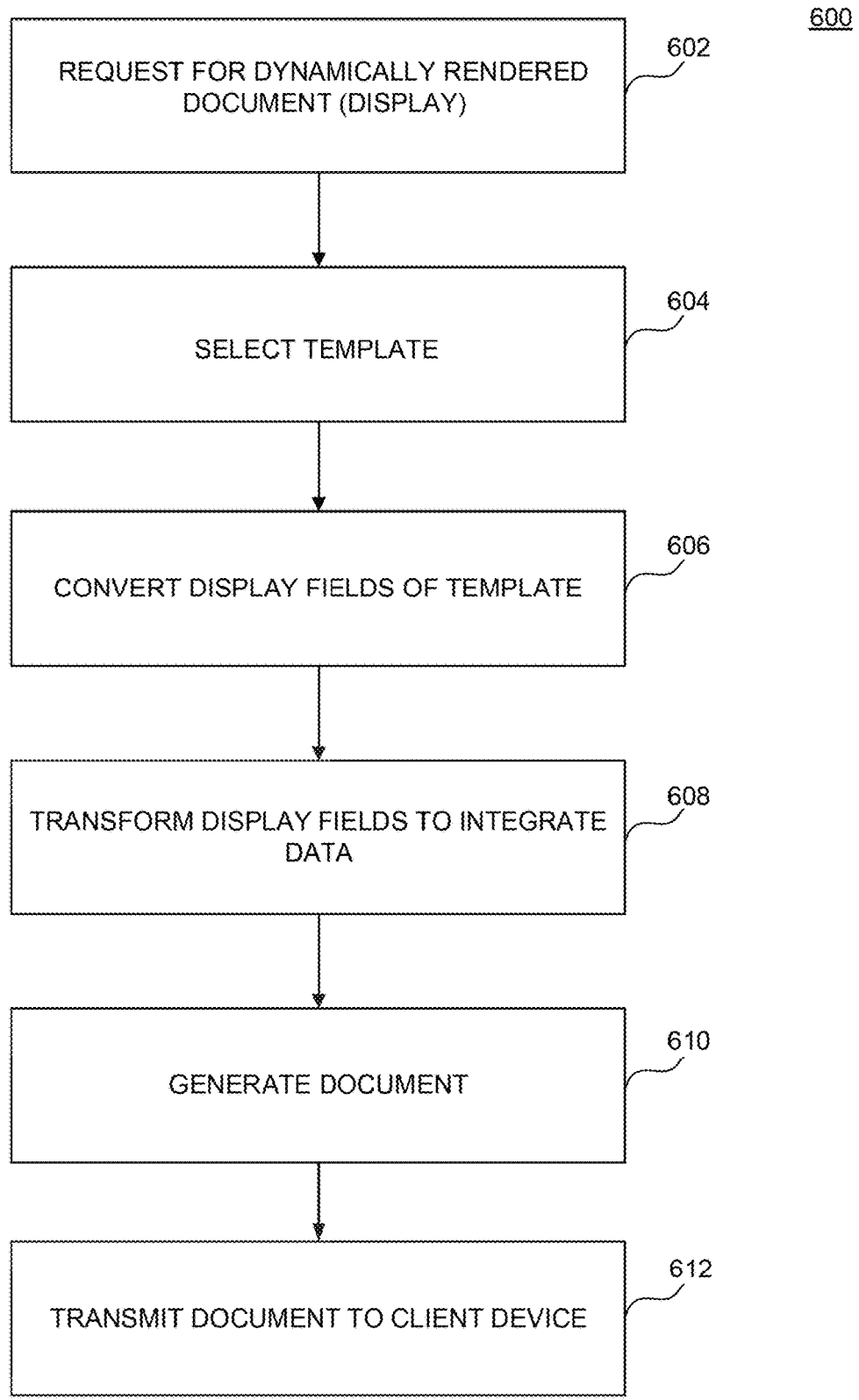
FIG. 6 depicts another flow diagram of rendering customized formatted documents, according to some embodiments.

FIG. 6 depicts a flow diagram for generating dynamically rendered documents (display layout), according to some embodiments. One or more processes described with respect to FIG. 6 may be performed by a mobile device (e.g., mobile device 102 of FIG. 1) or a server (e.g., part of cloud processing system 808 of FIG. 8). Moreover, it is to be appreciated that not all steps may be needed to perform the disclosure provided herein. Further, some of the steps may be performed simultaneously or in a different order than shown in FIG. 6, as will be understood by a person of ordinary skill in the art.

In step 602, one or more platforms, servers, databases, and/or mobile devices (hereafter system) receives a request for a dynamically rendered document (display). For example, a dealer may request a subset of possible display fields to be displayed with image or other data in a customized PDF format (static) as an offer to a customer. These display fields could be from dynamically generated fillable user interfaces, where the customer can submit their information. In this embodiment, the system can use the customer submitted information to generate the document. For some other cases, display field values could be auto generated by the internal system and will be given to the document generator to generate the document. The request may be sent to the one or more platforms, servers, databases as described in greater detail herein.

In step 604, the system selects a template from a database that includes at least the requested subset of fields. For example, a template includes an image field when the requester desires to include an image in a document (e.g., PDF). As another example, the template includes financing fields when the requester desires financing fields to be displayed in a document (e.g., PDF). In yet another example, the selection of a template may be based on exclusion of specific information. For example, a car dealer wanting to present an offer may want to include the image of the vehicle, features of the vehicle, and financing information, but exclude dealer cost or incentive information. In this case, the undesired information fields may be omitted (skipped) when converting the template (step 606 below) or alternatively, a template will be selected that does not include the dealer cost or incentive information as displayable fields.

In step 606, the system converts display fields of the template into an XML, document. In a first non-limiting example, dealers or internal systems want to send offers to customers. In this scenario, dealer or internal systems will choose an offers template and offer details (such as interest rate, vehicle information or some additional financial information) based on the offer they want to generate for the customer. These are details will be given to the document generator as a input, document generator converts this requestor input data into XML, so that it can be parsed using a precoded XLS document template to render the document and the final document will be displayed on customer screen.

In another non-limiting example, a dealer requests a form used to authorize the dealer to get a social security number (SSN) verified for the customer who is buying a car. In this case, the dealer will send a request to the customer to complete this form. The customer will be presented with a dynamically generated fillable document (based on SSN template) on their mobile or desktop devices, where the customer will be able to submit the information required to complete the form. Upon submission, the customer submitted data will be provided to the document generator to render the document using the SSN template. A final rendered document will be shared to the dealer.

In step 608, the system transforms the XML document using stylesheet information from the template to include integrating data and/or images (e.g., of specific vehicle selected). In one example, transaction information, such as, but not limited to, customer information, selected vehicle information, financial information (e.g., financing, options, etc.) are integrated.

In step 610, the system generates the document (PDF) from the converted XML document. When the system parses the user input with XSL document templates, initially it will generate the XML document. This XML document will be the one used to render the final PDF document.

In step 612, the system transmits the document (PDF) to a client device. In one embodiment, the document (PDF) is used by the dealer to complete a purchase transaction.

Figure 7:
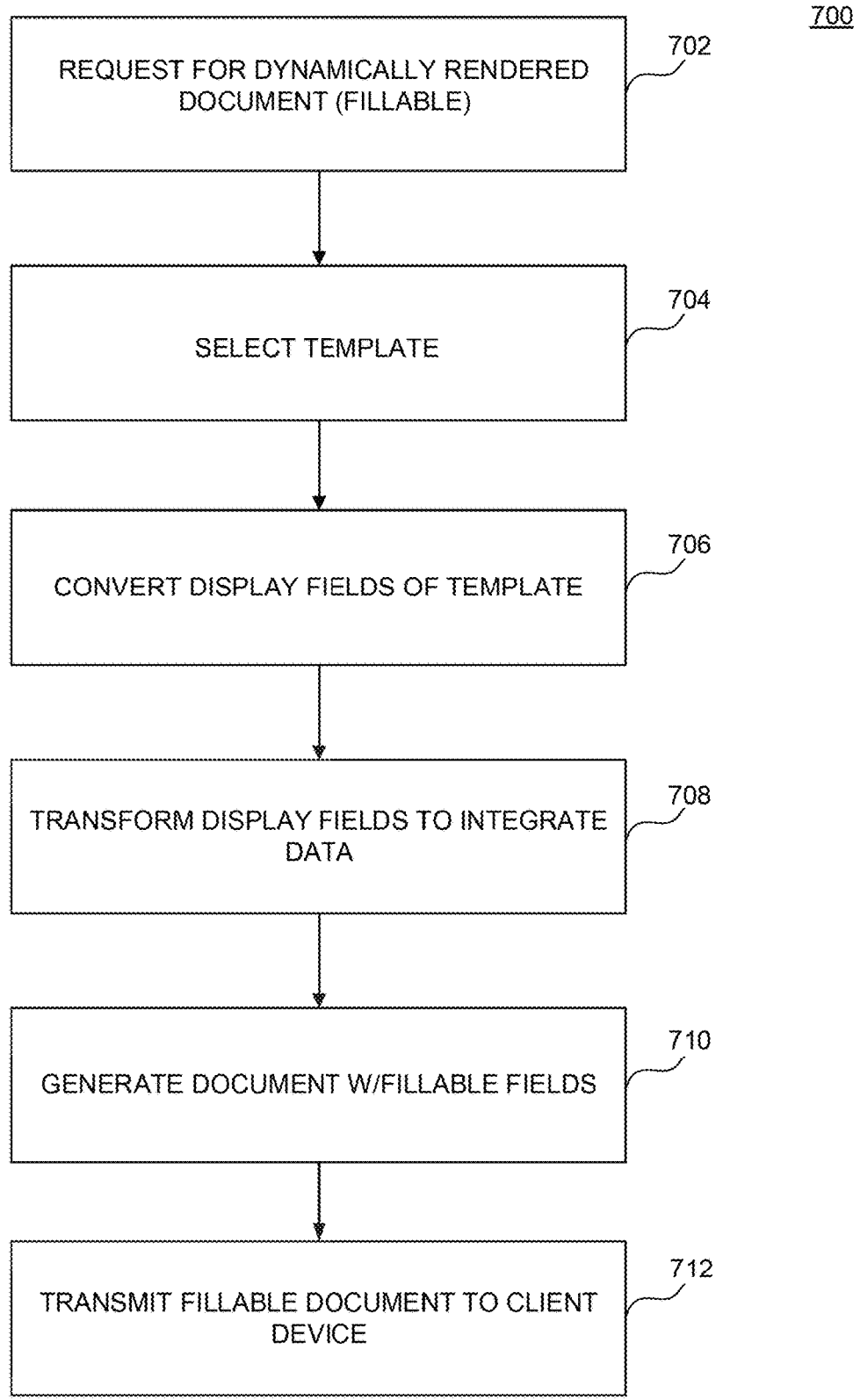
FIG. 7 depicts yet another flow diagram rendering customized formatted documents, according to some embodiments.

FIG. 7 depicts a flow diagram of rendering customized fillable documents (display interface), according to some embodiments. One or more processes described with respect to FIG. 7 may be performed by a mobile device (e.g., mobile device 102 of FIG. 1) or a server (e.g., part of cloud processing system 808 of FIG. 8). Moreover, it is to be appreciated that not all steps may be needed to perform the disclosure provided herein. Further, some of the steps may be performed simultaneously or in a different order than shown in FIG. 7, as will be understood by a person of ordinary skill in the art.

In step 702, one or more platforms, servers, databases, and/or mobile devices (hereafter system) receives a request for a dynamically rendered fillable document. For example, a dealer may request a subset of fields to be displayed with image or other data in a customized document (e.g., a fillable PDF format). The request is to be sent to the one or more platforms, servers, databases as described in greater detail herein.

In step 704, the system selects a template from a database that includes at least the requested subset of fillable fields. For example, a template includes various employment verification fields when the requester desires to include these fields in the PDF. As another example, the template includes financing fields (e.g., monthly payment) when the requester desires financing fields to be displayed in the dynamically rendered PDF. In yet another example, the selection of a template may be based on exclusion of specific information. For example, a car dealer wanting to process an employer verification process, may exclude customer/dealer confidential information.

In step 706, the system converts display fields of the template into an XML, document. In a first non-limiting example, dealers or internal systems want to send offers to customers. In this scenario, dealer or internal systems will choose an offers template and offer details (such as interest rate, vehicle information or some additional financial information) based on the offer they want to generate for the customer. These are details will be given to the document generator as a input, document generator converts this requestor input data into XML, so that it can be parsed using a precoded XLS document template to render the document and the final document will be displayed on customer screen.

In step 708, the system transforms the XML document using stylesheet information from the template to include integrating data and/or images (e.g., of specific vehicle selected). In one example, transaction information, such as, but not limited to, customer information, customer location, vehicle selected, financial information (e.g., financing, options, etc.) are integrated.

In step 710, the system generates the fillable document from the converted XML document. When the system parses the user input with XSL document templates, initially it will generate the XML document. This XML document will be the one used to render the final PDF document.

In step 712, the system transmits the fillable document to a client device. In an alternate embodiment, the fillable document is transmitted to a third party for completion (e.g., an employer fills in employment information requested within a fillable PDF).

Figure 8:
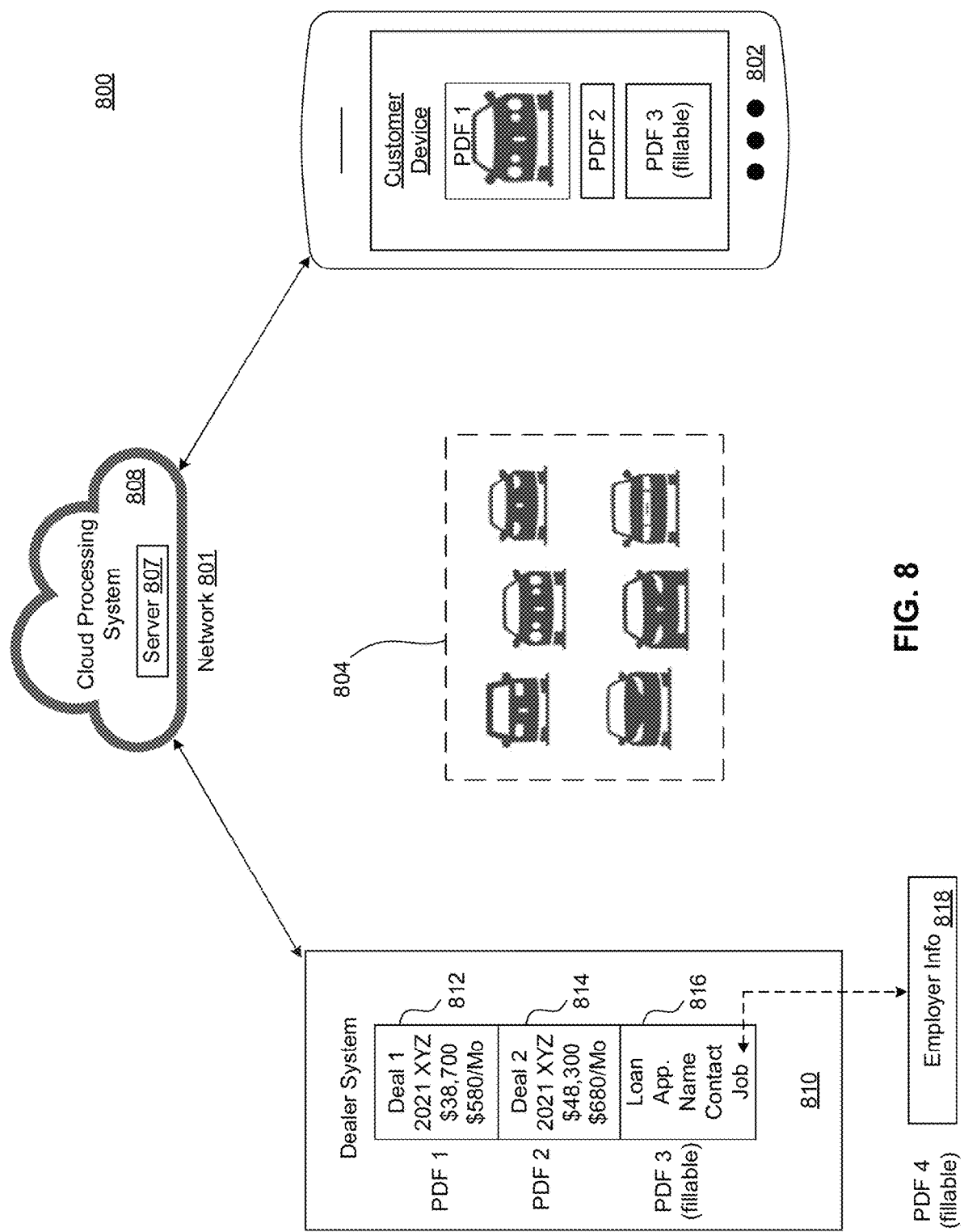
FIG. 8 depicts a block diagram flow diagram rendering customized formatted documents, according to some embodiments.

FIG. 8 depicts a block diagram of a system 800 for implementing cloud-based processes to create customized forms, according to some embodiments. One or more platforms, servers, databases, and/or mobile devices (hereafter system) receives a request for a dynamically rendered document. For example, a dealer system 810 may request a subset of fields to be displayed with image or other data in a customized PDF format (static or fillable).

In this example embodiment, a flow for a shopping experience using a mobile device is shown where a mobile device 802, such as a smart phone, interacts wirelessly over network 801 with one or more platforms. While shown as separate standalone platforms, one or more of the platforms can be combined or alternatively, be distributed as separate modules (e.g., a database module, an image processing module, financial module, PDF generator module, etc.). The standalone platforms can be implemented in cloud processing system 808, server 807, or implemented locally on the mobile device or dealer 810 onsite or remote computer systems without departing from the scope of the technology described herein.

System 800 may include a mobile device 802 interacting with cloud processing system 808, dealer system 810, for a potential purchase of vehicle 804 located on dealer lot 806 (or from online inventory). Mobile device 802 may be connected to the cloud processing system 808 and/or dealer system 810 (e.g., server platform) through wireless communication network 801.

While shown as separate from cloud processing system 808, dealer system 810 can be implemented in one or more servers 807 located in cloud processing system 808 or located locally at a dealership or remote dealership server network. Dealer system 810 may include one or more servers or databases such as an inventory database storing existing vehicle inventory, a vehicle information database storing specific vehicle information (pricing, features, options, color, specifications (e.g., drivetrain information, horsepower, torque, length, width, height, etc.) associated with a vehicle in the existing inventory.

Dealer system may dynamically display, on one or more displays operative with dealer system 810, one or more potential offers such as Deal 1 (812) or Deal 2 (814). Each of the one or more offers can be dynamically created as customized documents (e.g., PDFs) and presented to the customer with desired display fields in a desired format. In addition, fields deemed confidential to the dealer, for example, cost information or incentives, sales targets, etc., can also be dynamically hidden during the offer presentation. In a second phase, the dynamic document generation process can provide fillable documents (e.g., PDFs), such as a loan application 816, with a subset of fillable fields to be filled by the customer as part of a loan application or to be sent to a customer's employer in a customized fillable document (e.g., PDF) 818 to verify employment information electronically.

Mobile device 802 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, augmented reality headsets, interactive heads-up display (HUD), etc.), or a similar type of device. Mobile device 802 includes an interface that allows users to interact with and otherwise select objects displayed (e.g., displayed PDF documents and PDF fillable documents).

Mobile device 802 may also dynamically display, on one or more displays operative with dealer system 810, one or more potential offers such as Deal 1 (812) or Deal 2 (814). Each of the one or more offers can be dynamically created as customized documents (e.g., PDFs) and presented to the customer with desired display fields in a desired format. In addition, fields deemed confidential to the dealer, for example, cost information or incentives, sales targets, etc., can also be dynamically hidden during the offer presentation. In a second phase, the dynamic PDF generation process can provide fillable documents (e.g., PDFs), such as a loan application 816, with a subset of fillable fields provided in a customized fillable document (e.g., PDF 818) to be filled by the customer as part of a loan application or be sent to a customer's employer to verify employment information electronically.

Cloud processing system 808 may include one or more server devices (e.g., a host server, a web server, an application server, etc.), a data center device, or a similar device, capable of communicating with mobile device 802 via network 801. The server may include, but is not limited to, a template storage, an XSL (eXtensible Stylesheet Language) generator, an XML generator, a JAVAX (Java X) transformer, an XSL-FO (formatting objects) generator (e.g., PDF), an FOP (Formatting Objects Processor) renderer, image processor, and object processor/database. In some embodiments, the server may be implemented as a plurality of servers that function collectively as a cloud processing system 808 for storing/processing data received from mobile device 802 or dealer system 810. The plurality of servers can be co-located at a single location (e.g., server farm) or be geographically distributed across multiple locations and/or multiple servers.

In some embodiments, the server may include an image application including processing object information, processing requests associated with accessing, uploading, and deleting files, just to name a few examples. Object processor processes object information provided, for example, by mobile device 802. Instead of processing object information locally in mobile device 802, mobile device 802 may also send the object information to the server to perform the processing remotely. Like object storage, the object database may differ from conventional storage in that it is configured specifically to store unstructured data associated with objects as a single element.

Network 801 may include one or more wired and/or wireless networks. For example, the network 801 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 9:
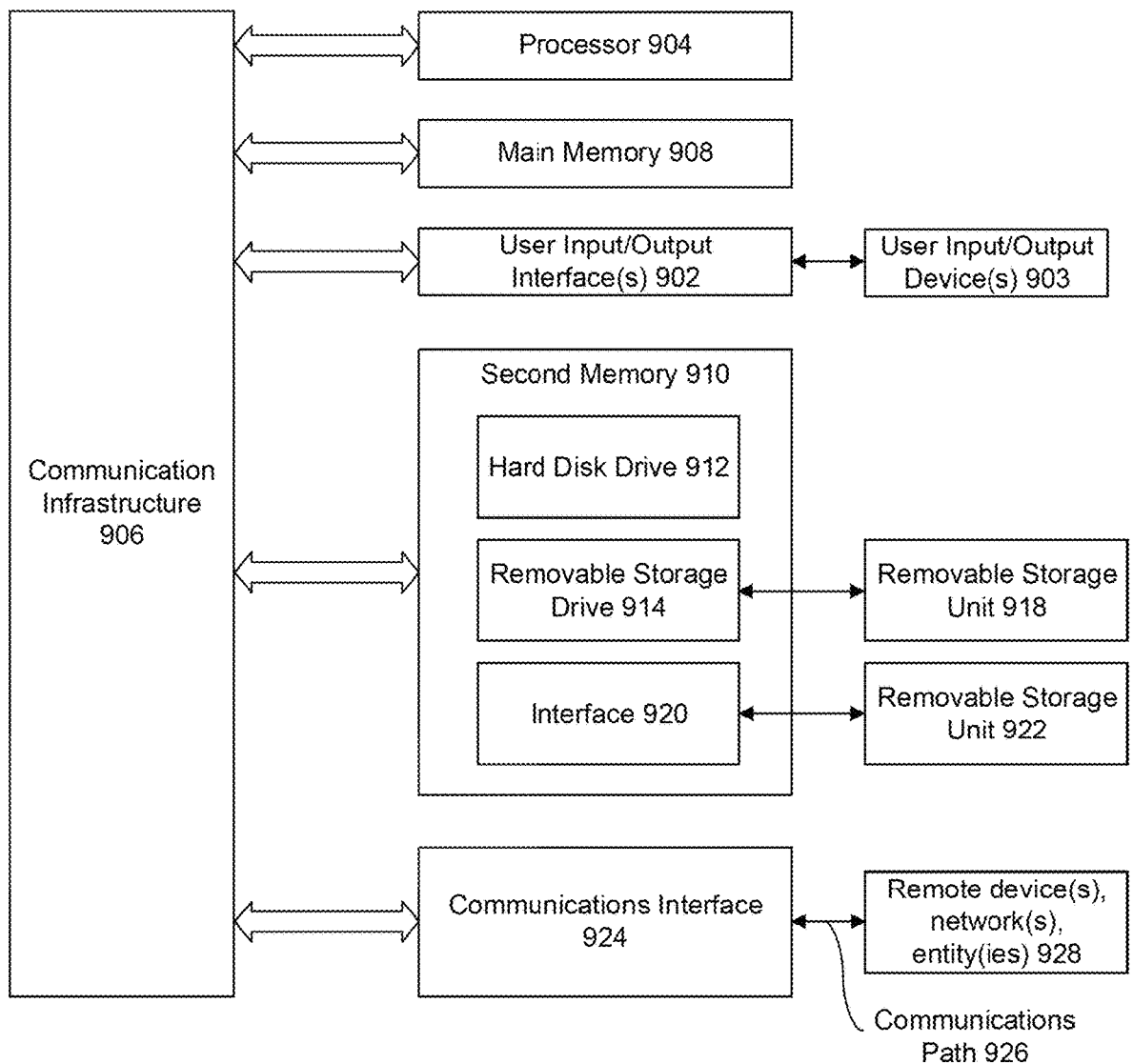
FIG. 9 depicts an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof. Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
    receiving, at a server and via a client application on a client device, a request for a dynamically rendered display interface, wherein the request comprises a Java Script Object Notation (JSON) request comprising at least data and a requested subset of display fields in an eXtensible Markup Language (XML) format, wherein the JSON request includes a request for a fillable instance of the dynamically rendered display interface;
    selecting, at the server and based on the requested subset of display fields, a first eXtensible Stylesheet Language (XSL) template from a plurality of XSL templates, wherein the first XSL template is selected based on a best match of template display fields to the requested subset of display fields;
    omitting, at the server, one or more of the template display fields from the first XSL template that are not in the requested subset of display fields to generate a final set of display fields;
    converting the first XSL template to the XML format;
    transforming, at the server, one or more of the final set of display fields to integrate the data into the first XSL template to produce a JSON form;
    generating, at the server, the fillable instance of the dynamically rendered display interface from the JSON form using a formatting objects (FO) renderer;
    transmitting the generated fillable instance of the dynamically rendered display interface to the client device; and
    whereby generated dynamically the fillable instance of the dynamically rendered display interface is displayable on the client device.

2. The method of claim 1, wherein the dynamically rendered display interface is configurable to receive select data field inputs.

3. The method of claim 2, wherein the select data field inputs are configured based on content of a consuming application.

4. The method of claim 2, wherein a layout of the data field inputs is configured based on content of a consuming application.

5. The method of claim 1, wherein the dynamically rendered display interface is further configured to receive one or more images related to the request for a dynamically rendered document as part of the JSON request.

6. The method of claim 1, wherein the converting includes conversion based on a JAVAX (Java X) transformation.

7. A system comprising:
    a host server having a processor communicatively coupled to a memory, the processor configured to:
        receive, via a client application executing on a client device, a Java Script Object Notation (JSON) request for a dynamically rendered display interface based on a customization of display fields;
        select a first eXtensible Stylesheet Language (XSL) template from a plurality of XSL templates based at least partially on the customization of display fields, wherein the first XSL template represents a closest match to the JSON request;
        convert template display fields of the first XSL template to an eXtensible Markup Language (XML) format based on the customization to generate final display fields;
        transform, based on a JAVAX (Java X) transformer, the final display fields to integrate data into the first XSL template and create a JSON form;
        generate, based on rendered Formatting Objects (FO), the dynamically rendered display interface from the JSON form;
        transmit the generated dynamically rendered display interface to the client device; and
        whereby generated the dynamically rendered display interface is displayable on the client device.

8. The system of claim 7, wherein the dynamically rendered display interface is configurable to receive select data field inputs.

9. The system of claim 8, wherein the select data field inputs are configured based on content of a consuming application.

10. The system of claim 8, wherein a layout of the data field inputs is configured based on content of a consuming application.

11. A non-transitory computer readable medium storing instructions that when executed by one or more processors of a device cause the one or more processors to:
    receive, via a client application executing on a client device, a Java Script Object Notation (JSON) request for a dynamically rendered display interface based on a customization of display fields;
    select a first eXtensible Stylesheet Language (XSL) template from a plurality of XSL templates based at least partially on the customization of the display fields, wherein the first XSL template represents a closest match to the JSON request;
    convert template display fields of the first XSL template to an eXtensible Markup Language (XML) format based on the customization to generate final display fields;
    transform, based on a JAVAX (Java X) transformer, the final display fields to integrate data into the first XSL template;
    generate the dynamically rendered display interface;
    transmit the generated dynamically rendered display interface to the client device; and whereby the generated dynamically rendered display interface is displayable on the client device.

12. The non-transitory computer readable medium of claim 11, wherein the dynamically rendered display interface is configurable to receive select data field inputs.

13. The non-transitory computer readable medium of claim 12, wherein the select data field inputs are configured based on content of a consuming application.

14. The non-transitory computer readable medium of claim 12, wherein a layout of the data field inputs is configured based on content of a consuming application.

15. The non-transitory computer readable medium of claim 11, wherein the dynamically rendered display interface is further configured to receive one or more images related to the request for a dynamically rendered document as part of the JSON request.

* * * * *